Aug. 24, 1937.   F. MOENING   2,090,696
TRACTOR LUG
Filed Jan. 8, 1934
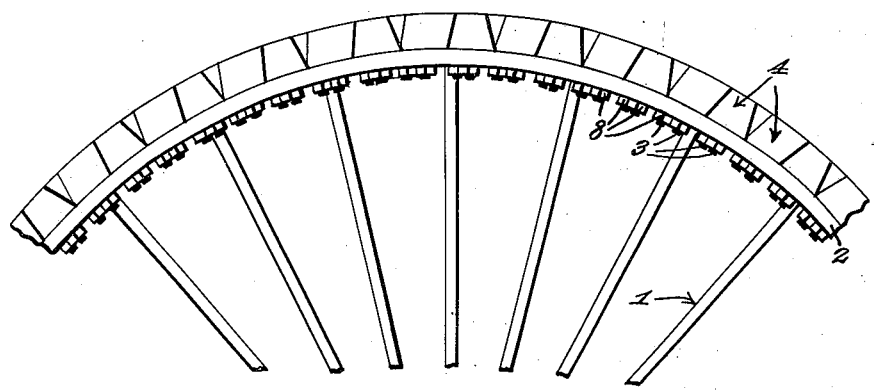
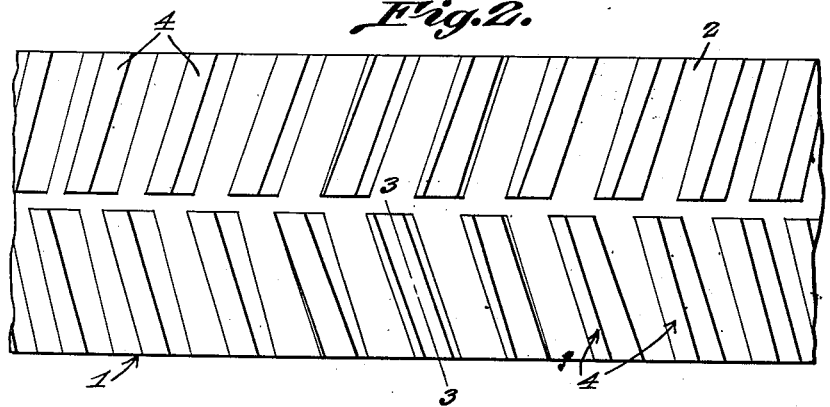
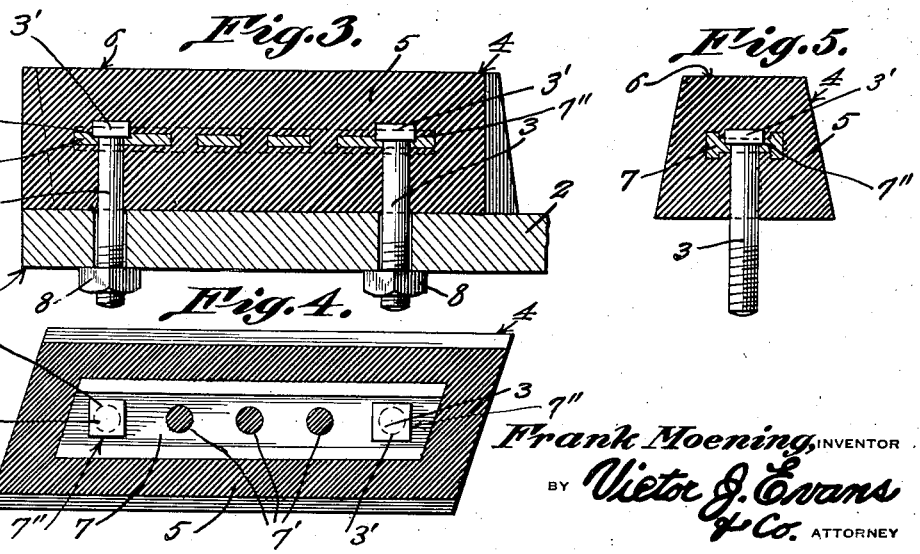
Frank Moening, INVENTOR
BY Victor J. Evans & Co. ATTORNEY Patented Aug. 24, 1937

2,090,696

UNITED STATES PATENT OFFICE 2,090,696

TRACTOR LUG

Frank Moening, Shepherd, Mich.

Application January 8, 1934, Serial No. 705,777

1 Claim. (Cl. 152—9)

This invention relates to tractor lugs and has for the primary object the provision of a device of the above stated character which may be easily and quickly attached to a conventional type of tractor wheel and will provide to the latter a desired cushioning effect to permit passing of the tractor over hard surfaces with vibration reduced to a minimum, thereby increasing the life of the tractor and rendering riding thereon more comfortable and when engaged with soft ground will provide desired traction to prevent slipping or skidding.

With these and other objects in view this invention consists in certain novel features of construction, combination and arrangement of parts to be hereinafter more fully described and claimed.

For a complete understanding of my invention, reference is to be had to the following description and accompanying drawing, in which—

Figure 1 is a fragmentary side elevation illustrating a tractor wheel with lugs applied thereto and constructed in accordance with my invention.

Figure 2 is a fragmentary plan view illustrating the same.

Figure 3 is a sectional view taken on the line 3—3 of Figure 2, illustrating the means of detachably connecting the lugs to the periphery of the tractor wheel.

Figure 4 is a horizontal sectional view illustrating the anchoring of the attaching means in the body of the lug.

Figure 5 is a transverse sectional view illustrating the same.

Referring in detail to the drawing, the numeral 1 indicates a fragmentary portion of a conventional type of tractor wheel in which the periphery 2 thereof is provided with series of openings 7' to receive fastening bolts or lugs 3 forming part of my invention.

Groups of tractor lugs 4 are mounted to the periphery 2 of the tractor wheel 1 and the lugs of each group parallel with one another and the lugs of one group are staggered to the lugs of the other group and further are arranged angularly, as shown in Figure 2.

Each lug consists of a resilient body 5 constructed of rubber or any other material suitable for the purpose. The ends of the body are cut on a bias or disposed angularly and said body tapers at each side towards the tread portion 6. A metallic anchoring element 7 is embedded in the body 5 and provided with a series of openings 7'. The end openings of said series receive therethrough the bolts 3. The heads 3' of the bolts 3 are partly received in square pockets 7" formed by depressing the outer face of the anchoring element 7 around the openings 7' through which the bolts pass and the head 3' of the bolts are of a thickness to project a slight but suitable distance beyond the channeled outer face of the said elements 7. (See Figures 3 and 5.) The bolts are thus not only held from turning on the plates 7, but the outer portions of the heads thereof are more effectively embedded in the rubber tread 6, in the process of manufacture, so that the heads of the bolts will be wholly and individually received in the said tread and thus afford separate anchoring means in addition to the ribbed edges and angle ends of the plates 7. The other openings of the series have the material of the body passing therethrough, thereby firmly securing the anchoring element 7 in place. The bolts 3 project outwardly of the body to extend through the apertures of the periphery of the wheel and receive thereon nuts 8. The anchoring element 7 is preferably of eye-beam construction or shape providing in opposite faces channels in which the material of the body may embed for further holding the anchoring element in position. It is to be understood that when the body is molded or formed the anchoring element is embedded therein along with the bolts.

Tractor lugs constructed in accordance with the foregoing may be easily and quickly applied to a conventional type of tractor wheel and will serve to prevent the wheel from slipping or skidding in soft ground and will provide a desired cushioning effect to the wheel when passing over hard surfaces.

Having described the invention, I claim:

A tractor lug to be removably positioned transversely on the flat tread of a tractor wheel comprising an elongated cushion body, an elongated longitudinally channeled anchoring element having a series of openings embedded in the body with the material of said body extending through certain of said openings, bolts having square heads extending through the other openings of the anchoring element and through one face of the body to have nuts turned thereon for securing the body to a wheel, said anchoring element has squared depressions around said bolt openings affording pockets for the heads of the bolts, and the said heads of the bolts, being of a thickness greater than the combined depth of the channel and pockets, as and for the purpose set forth.

FRANK MOENING.